(12) United States Patent
Heydari et al.

(10) Patent No.: US 10,730,966 B2
(45) Date of Patent: Aug. 4, 2020

(54) METAL COMPLEXES

(71) Applicant: Univation Technologies, LLC, Houston, TX (US)

(72) Inventors: Mahsa Heydari, Houston, TX (US); Roger L. Kuhlman, Freeport, TX (US); C. Jeff Harlan, Houston, TX (US)

(73) Assignee: Univation Technologies, LLC, Houston, TX (US)

( * ) Notice: Subject to any disclaimer, the term of this patent is extended or adjusted under 35 U.S.C. 154(b) by 7 days.

(21) Appl. No.: 16/089,478

(22) PCT Filed: Mar. 13, 2017

(86) PCT No.: PCT/US2017/022008
§ 371 (c)(1),
(2) Date: Sep. 28, 2018

(87) PCT Pub. No.: WO2017/172332
PCT Pub. Date: Oct. 5, 2017

(65) Prior Publication Data
US 2019/0144570 A1    May 16, 2019

Related U.S. Application Data

(60) Provisional application No. 62/314,480, filed on Mar. 29, 2016.

(51) Int. Cl.
| | | |
|---|---|---|
| C08F 4/659 | (2006.01) | |
| B01J 31/38 | (2006.01) | |
| C08F 210/16 | (2006.01) | |
| C07F 7/00 | (2006.01) | |
| C07F 7/28 | (2006.01) | |

(52) U.S. Cl.
CPC .............. *C08F 4/659* (2013.01); *B01J 31/38* (2013.01); *C07F 7/00* (2013.01); *C07F 7/003* (2013.01); *C07F 7/28* (2013.01); *C08F 210/16* (2013.01); *B01J 2231/12* (2013.01); *B01J 2531/46* (2013.01); *B01J 2531/48* (2013.01); *B01J 2531/49* (2013.01); *C08F 4/65912* (2013.01); *C08F 4/65916* (2013.01)

(58) Field of Classification Search
CPC . C08F 4/659; C08F 21/16; B01J 31/38; C07F 7/00
See application file for complete search history.

(56) References Cited

U.S. PATENT DOCUMENTS

| | | |
|---|---|---|
| 6,943,256 B2 | 9/2005 | Johnston et al. |
| 7,973,116 B2 | 7/2011 | Hagadorn et al. |
| 8,674,040 B2 | 3/2014 | Hagadorn et al. |
| 2002/0142912 A1 | 10/2002 | Boussie et al. |
| 2011/0294972 A1* | 12/2011 | Chevalier ............... C07F 7/00 526/190 |

FOREIGN PATENT DOCUMENTS

EP    1241175    9/2002

OTHER PUBLICATIONS

International Search Report & Written Opinion for related PCT Application PCT/US2017/022008, dated May 16, 2017 (16 pgs).
Siddiqi, et al., "The Ligand Properties of Quinolines, complex formation and metallation with group (VI) metal phalides and organotin(IV) halides"; Bulletin de la societe, chimique de France, vol. 1, Jan. 1, 1983 (4 pgs).
Ozkal, et al., "Cobalt(III)-Catalyzed Functionalization of Unstrained Carbon—Carbon Bonds through β-Carbon Cleavage of Alcohols"; ACS Publications, ACS Catalog, vol. 5 (2015) (5pgs).
Ozkal, et al., Supporting Information "Cobalt(III)-Catalyzed Functionalization of Unstrained Carbon—Carbon Bonds through β-Carbon Cleavage of Alcohols"; ACS Publications, ACS Catalog, vol. 5 (2015) (22 pgs).
International Preliminary Report on Patentability for related PCT Application PCT/US2017/022008, dated Oct. 11, 2018 (9 pgs).

* cited by examiner

*Primary Examiner* — Catherine S Branch
(74) *Attorney, Agent, or Firm* — Brooks, Cameron & Huebsch, PLLC

(57) ABSTRACT

Embodiments of the present disclosure are directed towards metal complexes that can be utilized to form polymers. As an example, the present disclosure provides a metal complex of Formula (I) wherein M is Zr, Hf, or Ti; each Het is independently a heterocyclic; each L is independently a bridging group; each X is independently Cl, Br, I, or alkyl; each $R^1$ is independently selected from the group including hydrogen, alkyls, alkenyls, alkynyls, cycloalkyls, aryls, acyls, aroyls, alkoxys, aryloxys, alkylthiols, dialkylamines, alkylamidos, alkoxycarbonyls, aryloxycarbonyls, carbomoyls, alkyl- and dialkyl-carbamoyls, acyloxys, acylaminos, aroylaminos, aromatic rings, fused aromatic rings, and combinations thereof; and each n is independently an integer having a value of one to five.

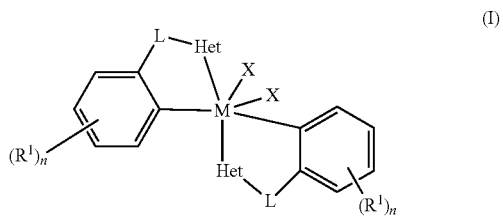

(I)

11 Claims, No Drawings

METAL COMPLEXES

This application is a National Stage Application under 35 U.S.C. § 371 of International Application Number PCT/US2017/022008, filed Mar. 13, 2017 and published as WO 2017/172332 on Oct. 5, 2017, which claims the benefit to U.S. Provisional Application 62/314,480, filed Mar. 29, 2016, the entire contents of which are incorporated herein by reference in its entirety.

FIELD OF DISCLOSURE

Embodiments of the present disclosure are directed towards metal complexes, more specifically, embodiments are directed towards metal complexes that can be utilized to form polymers.

BACKGROUND

Polymers may be utilized for a number of products including films and pipes, among other. Polymers can be formed by reacting one or more types of monomer in a polymerization reaction. There is continued focus in the industry on developing new and improved materials and/or processes that may be utilized to form polymers.

SUMMARY

The present disclosure provides metal complexes of Formula I:

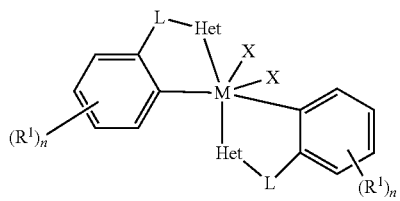

Formula I wherein M is Zr, Hf, or Ti; each Het is independently a heterocyclic; each L is independently a bridging group; each X is independently Cl, Br, I, or alkyl; each $R^1$ is independently selected from the group including hydrogen, alkyls, alkenyls, alkynyls, cycloalkyls, aryls, acyls, aroyls, alkoxys, aryloxys, alkylthiols, dialkylamines, alkylamidos, alkoxycarbonyls, aryloxycarbonyls, carbomoyls, alkyl- and dialkyl-carbamoyls, acyloxys, acylaminos, aroylaminos, aromatic rings, fused aromatic rings, and combinations thereof; and each n is independently an integer having a value of one to five.

The present disclosure provides metal complexes of Formula II:

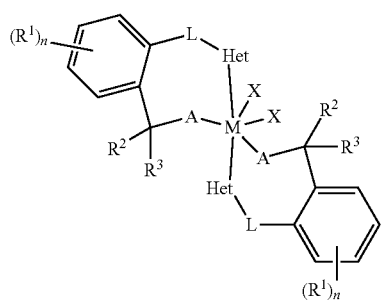

Formula II wherein the metal complex of Formula II is formed by reacting a metal complex of Formula I with a polar organic material selected from the group of ketones, aldehydes, imines, and combinations thereof; each A is independently O, S, or N—$R^4$; and each $R^2$, $R^3$ and, $R^4$ are independently selected from the group including hydrogen, alkyls, alkenyls, alkynyls, cycloalkyls, aryls, acyls, aroyls, alkoxys, aryloxys, alkylthiols, dialkylamines, alkylamidos, alkoxycarbonyls, aryloxycarbonyls, carbomoyls, alkyl- and dialkyl-carbamoyls, acyloxys, acylaminos, aroylaminos, aromatic rings, fused aromatic rings, and combinations thereof or $R^2$ and $R^3$ are combined to be an oxo group, an alkylimino group, or a thio group.

The present disclosure provides organic compounds of Formula III:

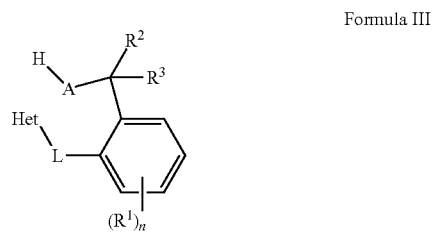

Formula III wherein the organic compound of Formula III is formed by reacting a metal complex of Formula II with a protic material; each A is independently O, S, or N—$R^4$; and each $R^2$, $R^3$ and, $R^4$ are independently selected from the group including hydrogen, alkyls, alkenyls, alkynyls, cycloalkyls, aryls, acyls, aroyls, alkoxys, aryloxys, alkylthiols, dialkylamines, alkylamidos, alkoxycarbonyls, aryloxycarbonyls, carbomoyls, alkyl- and dialkyl-carbamoyls, acyloxys, acylaminos, aroylaminos, aromatic rings, fused aromatic rings, and combinations thereof or $R^2$ and $R^3$ are combined to be an oxo group, an alkylimino group, or a thio group.

The present disclosure provides supported metal complexes including the metal complex of Formula I, an activator, and a support material.

The present disclosure provides supported metal complexes including the metal complex of Formula II, an activator, and a support material.

The present disclosure provides methods for forming a metal complex including reacting an aryl-heteroaryl compound with a metal dihalide precursor to form a metal complex of Formula I.

The methods can include reacting the metal complex of Formula I with a polar organic material selected from the group of and combinations thereof to form a metal complex of Formula II.

The present disclosure provides methods for forming organic compounds of Formula III.

The present disclosure provides methods for forming a polymer including contacting an olefin with a metal complex of Formula I.

The present disclosure provides methods for forming a polymer including contacting an olefin with a metal complex of Formula II.

The above summary of the present disclosure is not intended to describe each disclosed embodiment or every implementation of the present disclosure. The description that follows more particularly exemplifies illustrative embodiments. In several places throughout the application, guidance is provided through lists of examples, which examples can be used in various combinations. In each instance, the recited list serves only as a representative group and should not be interpreted as an exclusive list.

DETAILED DESCRIPTION

Metal complexes and methods of forming the same are described herein. The metal complexes described herein may be utilized as polymerization catalysts. For instance, embodiments of the present disclosure can provide an activity of 1000 grams of polymer per gram of supported metal complex, e.g., a supported catalyst as discussed herein, 1200 grams of polymer per gram of supported metal complex, 1400 grams of polymer per gram of supported metal complex, or even a greater activity. Additionally, unlike previous metal complexes, the metal complexes disclosed herein may advantageously be formed without a ligand purification step. Forming metal complexes without a ligand purification step may reduce manufacturing times and/or manufacturing costs associated with metal complex formation, decrease the number of synthesis steps required to generate the metal complex, and/or eliminate production of waste due to used solvents and byproducts usually utilized for ligand synthesis.

Embodiments of the present disclosure provide a metal complex of Formula I:

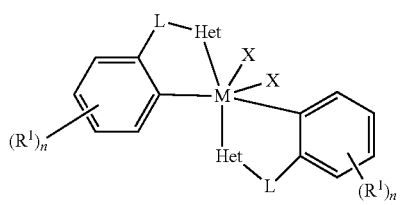

Formula I wherein M is Zr, Hf, or Ti; each Het is independently a heterocyclic; each L is independently a bridging group; each X is independently Cl, Br, I, or alkyl; each $R^1$ is independently selected from the group including hydrogen, alkyls, alkenyls, alkynyls, cycloalkyls, aryls, acyls, aroyls, alkoxys, aryloxys, alkylthiols, dialkylamines, alkylamidos, alkoxycarbonyls, aryloxycarbonyls, carbomoyls, alkyl- and dialkyl-carbamoyls, acyloxys, acylaminos, aroylaminos, aromatic rings, fused aromatic rings, and combinations thereof; and each n is independently an integer having a value of one to five.

Examples of heterocyclics, which may also be referred to as heterocyclic compounds or heterocycles, include, but are not limited to pyridine, thiophene, furan, phosphole, imidazole, imidazoline, pyrazole, thiazole, isothiazole, triazole, oxadiazole, thiadiazole, dithiazole, pyridine, pyran, thiopyran, diazine, oxazine, thiazine, pyridazine, pyrimidine, quinoline, isoquinoline, oxazole, pyrimidine, benzofuran, benzothiophene, combinations thereof, and derivatives thereof, among others. In a number of embodiments, the heterocyclic may include N, O, and/or S.

A bridging group may bridge, e.g., connect, one or more elements of a compound, e.g., the metal complex of Formula I, to one or more other elements of that compound. Examples of bridging groups include, but are not limited to $(CR_2)_m$ where m is 0, 1, 2, 3, or 4; O; S; or NR—, where each R is independently selected from the group including hydrogen, alkyls, alkenyls, alkynyls, cycloalkyls, aryls, acyls, aroyls, alkoxys, aryloxys, alkylthiols, dialkylamines, alkylamidos, alkoxycarbonyls, aryloxycarbonyls, carbomoyls, alkyl- and dialkyl-carbamoyls, acyloxys, acylaminos, aroylaminos, aromatic rings, fused aromatic rings, and combinations thereof.

As mentioned, in one or more embodiments the bridging group L may be $(CR_2)_m$, where m is 0; in other words L may be absent. While one skilled in the art clearly understands the meaning of Formula I where L is absent, the metal complex where L is absent may also be represented by the following Formula I(a):

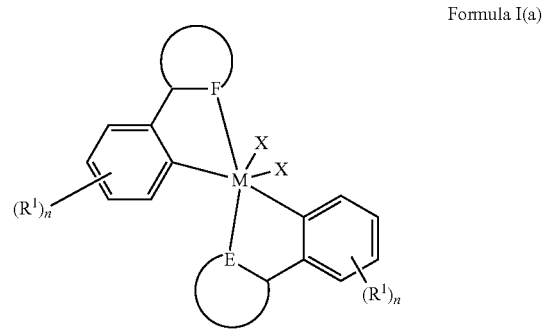

Formula I(a)

wherein each E independently represents a heteroatom.

As mentioned, heterocyclics may include N, O, or S. For Formula I(a), the heterocyclics are each represented by the circular structures including a respective E.

The metal complexes of Formula I may be formed by reacting an aryl-heteroaryl compound with a metal dihalide precursor. As used herein, an aryl-heteroaryl compound includes an aryl group and a heteroaryl group. Aryl-heteroaryl compounds may be obtained commercially and/or may be prepared via various synthesis methods.

The term "aryl" as used herein refers to an aromatic group. For instance, an aryl group may be derived from benzene, among others. Some specific examples of materials that include an aryl group are 4-t-butylbenzeneboronic acid and the metal complex of Formula I.

An aryl group of the metal complex of Formula I may include one or more substituent groups. For instance, as shown by Formula I, each aryl group has a respective substituent group $(R^1)_n$. Each $(R^1)_n$ may be independently selected from hydrogen, alkyls, alkenyls, alkynyls, cycloalkyls, aryls, acyls, aroyls, alkoxys, aryloxys, alkylthiols, dialkylamines, alkylamidos, alkoxycarbonyls, aryloxycarbonyls, carbomoyls, alkyl- and dialkyl-carbamoyls, acyloxys, acylaminos, aroylaminos, aromatic rings, fused aromatic rings, and combinations thereof, among others. Some embodiments provide that $(R^1)_n$ may be selected from methyl, ethyl, propyl, butyl, pentyl, hexyl, cyclopentyl, cyclohexyl, benzyl, phenyl, methylphenyl, and tert-butylphenyl groups, including all their isomers, for example, among others. As used herein, each "n" is independently an integer having a value of one to five. For example, each n may independently be an integer having a value of one, two, three, four, or five.

The term "heteroaryl" as used herein refers to an aromatic group having one or more atoms other than carbon in the ring. For instance, as shown by Formula I, each heteroaryl group includes a respective heteroatom "E". Embodiments of the present disclosure provide that each E is independently N, O, or S. Some examples of materials that include a heteroaryl group are thiophene, pyridine, isoxazole, pyrazole, pyrrole, furan, imidazole, oxazole, derivatives thereof, and the metal complex of Formula I.

As mentioned, the metal complexes of Formula I may be formed by reacting an aryl-heteroaryl compound with a metal dihalide precursor. The metal dihalide precursor, which may be referred to as an organometallic precursor, includes a metal atom, i.e., the "M" of the metal complex of Formula I. Embodiments of the present disclosure provide that M is Zr, Hf, or Ti.

The metal dihalide precursor includes at least two halogen atoms. A number of embodiments of the present disclosure provide that the metal dihalide precursor includes at least two chlorine atoms. In one or more embodiments, the metal dihalide precursor may be a metal dichloride precursor. Embodiments of the present disclosure provide that the metal dihalide precursor may include other atoms and/or functional groups. For instance, the metal dihalide precursor may include a number of benzyl groups. A specific example of the metal dihalide precursor is dibenzyldichlorozirconium etherate, i.e., $Bn_2ZrCl_2$-ether.

The aryl-heteroaryl compound and the metal dihalide precursor can be reacted in various concentrations to form the metal complexes of Formula I. For example, the aryl-heteroaryl compound and the metal dihalide can be reacted at a molar ratio from 1:20 to 20:1 moles of aryl-heteroaryl compound to moles of metal dihalide precursor.

The aryl-heteroaryl compound and the metal dihalide precursor can be reacted at various temperatures to form the metal complexes of Formula I. For example, the aryl-heteroaryl compound and the metal dihalide can be reacted at a temperature from 0° C. to 150° C.

The aryl-heteroaryl compound and the metal dihalide precursor can be reacted in the presence of additional materials. For example, the aryl-heteroaryl compound and the metal dihalide can be reacted in the presence of a solvent, a catalyst, and/or an accelerator, among others.

The metal complexes of Formula I may be utilized as polymerization catalysts. Additionally, the metal complexes of Formula I may be utilized to form a metal complex of Formula II:

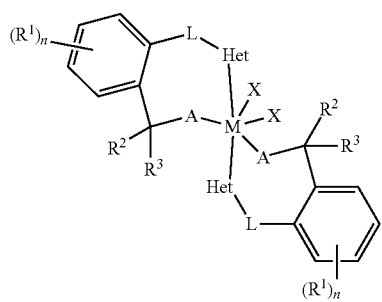

Formula II wherein the metal complex of Formula II is formed by reacting the metal complex of Formula I with a polar organic material selected from the group of ketones, aldehydes, imines, and combinations thereof; each A is independently O, S, or N—$R^4$; and each $R^2$, $R^3$ and, $R^4$ are independently selected from the group including hydrogen, alkyls, alkenyls, alkynyls, cycloalkyls, aryls, acyls, aroyls, alkoxys, aryloxys, alkylthiols, dialkylamines, alkylamidos, alkoxycarbonyls, aryloxycarbonyls, carbomoyls, alkyl- and dialkyl-carbamoyls, acyloxys, acylaminos, aroylaminos, aromatic rings, fused aromatic rings, and combinations thereof or $R^2$ and $R^3$ are combined to be an oxo group, an alkylimino group, or a thio group. The metal complexes of Formula II may be utilized as polymerization catalysts.

As mentioned, in one or more embodiments the bridging group L, which is shown in Formula II, may be $(CR_2)_m$, where m is 0; in other words L may be absent. While one skilled in the art clearly understands the meaning of Formula II where L is absent, the metal complex where L is absent may also be represented by the following Formula II(a):

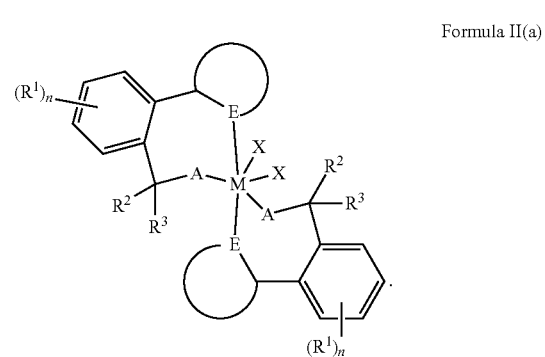

Formula II(a)

The metal complexes of Formula II may be formed by reacting a metal complex of Formula I with a polar organic material. Examples of the polar organic material include ketones, aldehydes, imines, and combinations thereof, among others. For instance, a metal complex of Formula II may be formed by reacting a metal complex of Formula I and acetone. In a number of embodiments of the present disclosure, the polar organic material may be selected from nitriles, imines, carbodimides, cyanates, isocyanates, and combinations thereof.

The metal complex of Formula I and the polar organic material can be reacted in various concentrations to form the metal complexes of Formula II. For example, the metal complex of Formula I and the polar organic material can be reacted at a molar ratio from 1:5000 to 200:1 moles of the metal complex of Formula I to moles of polar organic material, among other molar ratios of moles of the metal complex of Formula I to moles of polar organic material.

The metal complex of Formula I and the polar organic material can be reacted at various temperatures to form the metal complexes of Formula II. For example, the metal complex of Formula I and the polar organic material can be reacted at a temperature from 0° C. to 150° C.

The metal complex of Formula I and the polar organic material can be reacted in the presence of additional materials. For example, the metal complex of Formula I and polar organic material can be reacted in the presence of a solvent, a catalyst, and/or an accelerator, among others.

Embodiments of the present disclosure provides organic compounds of Formula III:

Formula III wherein the organic compound of Formula III is formed by reacting a metal complex of Formula II with a protic material; each A is independently O, S, or N—$R^4$; and each $R^2$, $R^3$ and, $R^4$ are independently selected from the group including hydrogen, alkyls, alkenyls, alkynyls, cycloalkyls, aryls, acyls, aroyls, alkoxys, aryloxys, alkylthiols, dialkylamines, alkylamidos, alkoxycarbonyls, aryloxycarbonyls, carbomoyls, alkyl- and dialkyl-carbamoyls, acyloxys, acylaminos, aroylaminos, aromatic rings, fused aromatic rings, and combinations thereof or $R^2$ and $R^3$ are combined to be an oxo group, an alkylimino group, or a thio group. Examples of a protic material include water and hydrochloric acid, among others. The protic material may be a protic solvent or a protic reagent, for instance.

The metal complexes of Formula II and the protic material can be reacted in various concentrations to form the organic compounds of Formula III. For example, metal complexes of Formula II and the protic material can be reacted at a molar ratio from 1:50 to 50:1 moles of metal complexes of Formula II to moles of protic material.

The metal complexes of Formula II and the protic material can be reacted at various temperatures to form the organic compounds of Formula III. For example, the metal complexes of Formula II and the protic material can be reacted at a temperature from 0° C. to 150° C.

Embodiments of the present disclosure provide a supported metal complex. For instance, the metal complexes of Formula I and/or the metal complexes of Formula II may be combined with a support material to form a supported metal complex. Examples of the support material include inorganic oxides such as silica, alumina, titania, zirconia, thoria, as well as mixtures of such oxides such as, for example, silica-chromium, silica-alumina, silica-titania, among others. The amount of support material employed in forming the supported metal complex may be from about 1 to about 80 percent by weight, or from about 10 to about 60 percent by weight, or from about 20 to about 50 percent by weight, based on the total weight of the supported metal complex.

Some embodiments of the present disclosure provide that the supported metal complex may include an activator. The activator may be an alumoxane. Alumoxanes can be described as oligomeric compounds containing —Al($R^5$)—O— subunits, where $R^5$ is an alkyl group. Examples of alumoxanes include methylalumoxane (MAO), modified methylalumoxane (MMAO), ethylalumoxane, and isobutylalumoxane, among others. For a number of embodiments, a mixture of different alumoxanes and modified alumoxanes may also be utilized. The activator can be included at a molar ratio from 1:5 to 1000:1 moles of the activator to moles of the metal complex.

The supported metal complex may be formed by various known methods. For instance, the metal complex of Formula I and/or the metal complex of Formula II may be contacted with the support material in a solution, in a slurry, or in solid form, or some combination thereof, and may be heated to desirable temperature, for a specified time, for forming the supported metal complex.

The supported metal complex may be formed by combining one or more metal complexes with one or more activators and then combining the resulting mixture with one or more support materials, for example. The supported metal complex may be formed by combining one or more activators with one or more support materials and then combining the resulting mixture with one or more metal complexes, for example. The components may be combined in the presence of a liquid diluent. For instance, the diluent may be employed for forming a suspension. Hydrocarbons such as linear or branched alkanes including n-hexane, n-pentane and isopentane; aromatics such as toluene and xylene; and halogenated hydrocarbons such as dichloromethane are useful as the diluent, among others.

The contact time for the one or more activators and one or more metal complexes may vary, e.g., depending on one or more of the conditions of temperature, pressure, type of mixing apparatus, and/or the quantities of the components to be combined when forming the supported metal complex.

The supported metal complex may be formed by a spray dried process. For instance, a suspension of one or more of the metal complexes, one or more activators, and one or more support materials may be formed in a liquid diluent and then the suspension may be spray dried.

Spray drying may be performed by spraying the suspension through a heated nozzle into a stream of heated inert drying gas, such as nitrogen, argon, or propane to evaporate the diluent and produce solid-form particles, e.g., the supported metal complex disclosed herein. The volumetric flow of the drying gas may be considerably larger than the volumetric flow of the suspension. Atomization of the suspension may be accomplished using an atomizing nozzle or a centrifugal high speed disc atomizer, for example.

The amounts of metal complex and activator compound employed in the suspension of metal complex, activator and support material may vary, for example, based upon on the type of activator utilized. For instance, when the activator is a branched or cyclic alumoxane the mole ratio of aluminum atoms (from the activator) to the metal "M" (from the metal complex) in the suspension may be between about 10 and about 5000, or between about 50 to about 1000, or between about 100 to about 500.

The amount of support material employed in forming the suspension may be from about 1 to about 80 percent by weight, or from about 10 to about 60 percent by weight, or from about 20 to about 50 percent by weight, based on the total weight of the supported metal complex.

The spray dried, supported metal complex may be a particulate material. The particles of supported metal complex may have an average particle size of 5 to 500, or from 10 to 80, micrometers, among others.

As mentioned, the metal complexes disclosed herein may be utilized as polymerization catalysts. In other words, the metal complexes disclosed herein may be utilized to form polymers. Polymerization processes, which utilize the metal complexes disclosed herein, include contacting an olefin with one or more of the metal complexes. Polymerization processes, which utilize the metal complexes disclosed herein, include solution polymerization processes, gas phase polymerization processes, slurry phase polymerization processes, high pressure polymerization processes, and combinations thereof. For instance, the polymerization process may be a gas phase or slurry phase polymerization of one or more olefins at least one of which is ethylene or propylene. The reactor may be a gas phase fluidized bed polymerization reactor, for example.

The metal complexes disclosed herein may be used for a variety of applications including prepolymerization and/or polymerization processes over a range of temperatures and pressures. The prepolymerization and/or polymerization process temperatures may be in the range of from −60° C. to about 280° C., from 50° C. to about 200° C., or from 60° C. to 120° C., for example.

The polymerization process may utilize one or more olefin monomers having from 2 to 30 carbon atoms; for a number of applications the polymerization process may utilize one or more olefin monomers having from 2 to 12 carbon atoms; and for a number of applications the polymerization process may utilize one or more olefin monomers having from 2 to 8 carbon atoms. The polymerization process may utilized two or more olefins or comonomers such as ethylene, propylene, 1-butene, 1-pentene, 4-methyl-1-pentene, 1-hexene, 1-octene 1-decene, among others.

Other olefins that may be utilized in the polymerization process include ethylenically unsaturated monomers, diolefins having 4 to 18 carbon atoms, conjugated or nonconjugated dienes, polyenes, vinyl monomers and cyclic olefins, for example. Examples of the monomers may include, but are not limited to, norbornene, norbornadiene, isobutylene, isoprene, vinylbenzocyclobutane, styrenes, alkyl substituted styrene, ethylidene norbornene, dicyclopentadiene and cyclopentene. In a number of embodiments of the polymerization process, a copolymer of ethylene can be produced, where with ethylene, a comonomer having at least one alpha-olefin having from 4 to 15 carbon atoms, preferably from 4 to 12 carbon atoms, and most preferably from 4 to 8 carbon atoms, is polymerized in a gas phase process. In another embodiment of the polymerization process, ethylene or propylene can be polymerized with at least two different comonomers, optionally one of which may be a diene, to form a terpolymer.

In a number of embodiments, the polymerization process may be a gas phase or slurry phase process, for polymerizing propylene alone or with one or more other monomers including ethylene, and/or other olefins having from 4 to 12 carbon atoms. The polymerization process may comprise contacting ethylene and optionally an alpha-olefin with one or more of the metal complexes disclosed herein in a reactor under polymerization conditions to produce the ethylene polymer or copolymer.

Gas phase polymerization processes are known. Gas phase polymerization processes are described in, for example, U.S. Pat. Nos. 4,543,399, 4,588,790, 5,028,670, 5,317,036, 5,352,749, 5,405,922, 5,436,304, 5,453,471, 5,462,999, 5,616,661, 5,668,228, 5,627,242, 5,665,818, and 5,677,375, among others.

A slurry polymerization process may utilize a pressure in the range of from about 1 to about 50 atmospheres, or even greater, and a temperature in the range of 0° C. to about 120° C. In a slurry polymerization process, a suspension of solid, particulate polymer can be formed in a liquid polymerization diluent medium to which components such as one or more of the metal complexes disclosed herein, ethylene, comonomers, and/or hydrogen, may be added. The suspension, including diluent, can be intermittently or continuously removed from the reactor where the volatile components are separated from the polymer and recycled, optionally after a distillation, to the reactor. The liquid diluent employed in the polymerization medium can be an alkane having from 3 to 7 carbon atoms; for some applications a branched alkane can be utilized. The medium employed can be a liquid under the conditions of polymerization and relatively inert. When a propane medium is used the process may be operated above the reaction diluent critical temperature and pressure. Preferably, a hexane or an isobutane medium is employed.

In a number of embodiments, the polymerization process may be referred to as a particle form polymerization or a slurry process where the temperature is kept below the temperature at which the polymer goes into solution. Such technique is known and described in, for instance, U.S. Pat. No. 3,248,179. Other slurry processes that may be utilized include those employing a loop reactor and those utilizing a plurality of stirred reactors in series, parallel, or combinations thereof. Examples of slurry processes include continuous loop or stirred tank processes. Also, other examples of slurry processes are described in U.S. Pat. No. 4,613,484. Examples of solution processes are described in U.S. Pat. Nos. 4,271,060, 5,001,205, 5,236,998 and 5,589,555.

EXAMPLES

In the Examples, various terms and designations for materials are used including, for instance, the following: 2-bromopyridine (heteroaryl compound, available from Sigma-Aldrich); 4-t-butylbenzeneboronic acid (aryl compound, available from Combi-Blocks); tetrahydrofuran (available from Sigma-Aldrich); [(P$^t$Bu$_3$)PdBr]$_2$ (catalyst, available from Strem); tetrabenzylzirconium (available from Strem); zirconium(IV) chloride (available from Strem); dicyclohexylcarbodiimide (available from Sigma-Aldrich); silica (support material, Davison 757-875, available from PQ Corporation); methylaluminoxane (activator, available from Albemarle).

An aryl-heteroaryl compound was prepared as follows. 2-bromopyridine (4.00 g), 4-t-butylbenzeneboronic acid (5.86 g), tetrahydrofuran (40 mL) and potassium hydroxide (4.26 g) were added to a container. [(P$^t$Bu$_3$)PdBr]$_2$ (0.19 g) was slowly added to the contents of the container, which resulted in generation of heat and tetrahydrofuran reflux. The contents of the container were stirred for 40 minutes, after which solvent was removed by rotovap. Ether (200 mL) and NaOH (1M, 150 mL) were added to the contents of the container and stirred for 20 minutes. Then, the organic layer was separated and washed with water (100 mL) and brine (100 mL), and then passed through a plug of silica to provide a filtrate. Volatiles were evaporated from the filtrate yield 5.18 g (97% yield) of a clear light orange liquid, shown by $^1$H and $^{13}$C NMR to be 2-(4-$^t$Bu-C$_6$H$_4$)-pyridine, i.e. the aryl-heteroaryl compound.

Dibenzyldichlorozirconium etherate, a metal dihalide precursor, was prepared as follows. Tetrabenzylzirconium (5.00 g) was added to zirconium(IV) chloride (2.56 g) in ether (35 mL) to form a slurry. After stirring for 90 min, the slurry was filtered to remove trace gray solids, and the filtrate held in the freezer to crystallize the product. The liquid layer was decanted and the crystalline product dried in vacuo to yield 7.00 g of dibenzyldichlorozirconium etherate. The structure was confirmed by $^1$H and $^{13}$C NMR.

Example 1, a metal complex of Formula I, was prepared as follows. 2-(4-$^t$Bu-C$_6$H$_4$)-pyridine (1.97 g), as prepared above, dibenzyldichlorozirconium etherate (2.00 g), as prepared above, and toluene were added to a container and maintained at 60° C. for two hours, after which the contents of the container were cooled to room temperature. Solvent was removed from the contents of the container by vacuum to yield Example 1, which was washed with hexane (three 10 mL washes) and then dried. Example 1, a metal complex of Formula I, was shown by $^1$H and $^{13}$C NMR; the yield was 2.59 g (96%).

Example 2, a metal complex of Formula II, was prepared as follows. Example 1 (0.900 g), dry acetone (0.37 mL), and toluene (9 mL) were added to a container and maintained at 50° C. for approximately twelve hours to yield Example 2. A portion (0.2 mL) of the contents of the container was withdrawn and combined with water to protonolyze the organic ligand, which was then extracted into ether and analyzed by GC/MS. The GC/MS indicated conversion to the expected pyridyl alcohol. Example 2 was crystallized from the toluene, and shown by single crystal X-ray crystallography to have the structure of Formula II.

Example 3, a supported metal complex, was prepared as follows. Example 2 (6 mL, 0.0115M) and a toluene solution of dicyclohexylcarbodiimide (1 mL, 0.14M) were sealed in a first container and maintained at 50° C. for approximately twelve hours. Davison 757-875 silica (1.00 g), toluene (4 mL), and methylaluminoxane (30 wt % in toluene, 1.0 mL) were added to a second container and stirred for 30 minutes at room temperature. The contents of the first container and the second container were combined and stirred for 60 minutes at room temperature. Volatiles were removed by vacuum to provide Example 3 (1.402 g).

Example 3 was utilized for ethylene polymerization reactions conducted in a lab-scale gas phase polymerization reactor (2 liter, stainless steel autoclave equipped with a variable speed mechanical agitator). For respective ethylene polymerization reactions, the reactor was charged with dried NaCl (400 g) and heated to 105° C. under a stream of nitrogen for one hour. Then the reactor was purged 6 times with nitrogen, silica supported methylaluminoxane was added as a scavenger to the reactor, the reactor temperature was adjusted to approximately 85° C., the reactor was sealed, and the contents of the reactor were lightly stirred. The reactor was preloaded with hydrogen, ethylene, and 1-hexene to a total pressure of 240 PSI. Upon reaching steady state, Example 3 (30 mg) was charged into the reactor using a stainless steel bomb to start polymerization. The reactor temperature was maintained at 85° C. for the 60 minute polymerization, where hydrogen, $C_6/C_2$ ratio and ethylene pressure were maintained constant. At the end of the 60 minute polymerization, the reactor was cooled down, vented and opened. The resulting mixture (containing polymer product and residual salt) was washed with water, and dried. Polymer product yield was approximately 30.1 g, indicating that Example 3 was an effective polymerization catalyst.

What is claimed:

1. A metal complex of Formula II:

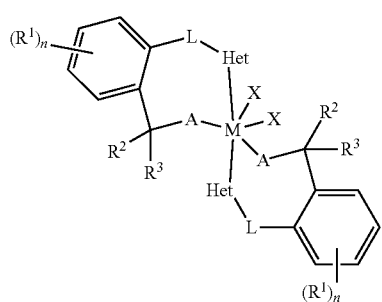

Formula II wherein the metal complex of Formula II is formed by reacting a metal complex of Formula I with a polar organic material selected from the group of ketones, aldehydes, imines, and combinations thereof; each A is independently O, S, or N—$R^4$; and each $R^2$, $R^3$ and, $R^4$ are independently selected from the group including hydrogen, alkyls, alkenyls, alkynyls, cycloalkyls, aryls, acyls, aroyls, alkoxys, aryloxys, alkylthiols, dialkylamines, alkylamidos, alkoxycarbonyls, aryloxycarbonyls, carbomoyls, alkyl- and dialkyl-carbamoyls, acyloxys, acylaminos, aroylaminos, aromatic rings, fused aromatic rings, and combinations thereof or $R^2$ and $R^3$ are combined to be an oxo group, an alkylimino group, or a thio group, wherein the metal complex of Formula I is:

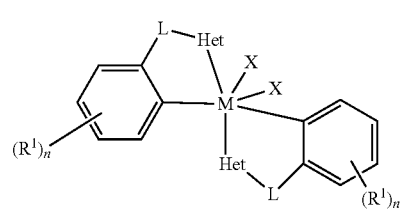

Formula I wherein M is Zr, Hf, or Ti; each Het is independently a heterocyclic; each L is independently a bridging group; each X is independently Cl, Br, I, or alkyl; each R1 is independently selected from the group including hydrogen, alkyls, alkenyls, alkynyls, cycloalkyls, aryls, acyls, aroyls, alkoxys, aryloxys, alkylthiols, dialkylamines, alkylamidos, alkoxycarbonyls, aryloxycarbonyls, carbomoyls, alkyl- and dialkyl-carbamoyls, acyloxys, acylaminos, aroylaminos, aromatic rings, fused aromatic rings, and combinations thereof; and each n is independently an integer having a value of one to five.

2. The metal complex of claim 1, wherein M is Zr.

3. The metal complex of claim 2, wherein each heterocyclic includes N.

4. The metal complex of claim 3, wherein the polar organic material is a ketone.

5. The metal complex of claim 3, wherein the ketone is acetone.

6. A supported metal complex comprising:
the metal complex of claim 1;
an activator; and
a support material.

7. A method for forming a metal complex comprising:
reacting an aryl-heteroaryl compound with a metal dihalide precursor to form a metal complex of Formula I:

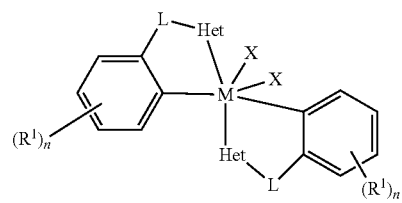

Formula I wherein M is Zr, Hf, or Ti; each Het is independently a heterocyclic; each L is independently a bridging group; each X is independently Cl, Br, I, or alkyl; each $R^1$ is independently selected from the group including hydrogen, alkyls, alkenyls, alkynyls, cycloalkyls, aryls, acyls, aroyls, alkoxys, aryloxys, alkylthiols, dialkylamines, alkylamidos, alkoxycarbonyls, aryloxycarbonyls, carbomoyls, alkyl- and dialkyl-carbamoyls, acyloxys, acylaminos, aroylaminos, aromatic rings, fused aromatic rings, and combinations thereof; and each n is independently an integer having a value of one to five.

8. The method of claim 7, wherein the metal dihalide is dibenzyldichlorozirconium etherate.

9. The method of claim 7, futher comprising:
reacting the metal complex of claim 7 with a polar organic material selected from the group of ketones, aldehydes, imines, and combinations thereof to form a metal complex of Formula II:

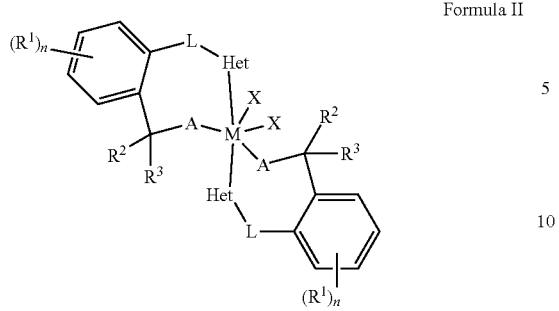

Formula II wherein each A is independently O, S, or N-$R^4$; and each $R^2$, $R^3$ and, $R^4$ are independently selected from the group including hydrogen, alkyls, alkenyls, alkynyls, cycloalkyls, aryls, acyls, aroyls, alkoxys, aryloxys, alkylthiols, dialkylamines, alkylamidos, alkoxycarbonyls, aryloxycarbonyls, carbomoyls, alkyl- and dialkyl-carbamoyls, acyloxys, acylaminos, aroylaminos, aromatic rings, fused aromatic rings, and combinations thereof or $R^2$ and $R^3$ are combined to be an oxo group, an alkylimino group, or a thio group.

10. The method of claim 9, wherein the polar organic material is a ketone.

11. A method of forming a polymer comprising:
contacting an olefin with a metal complex of claim 1.

* * * * *